(12) United States Patent
Nassar

(10) Patent No.: US 10,911,718 B2
(45) Date of Patent: Feb. 2, 2021

(54) ENHANCING MEETING PARTICIPATION BY AN INTERACTIVE VIRTUAL ASSISTANT

(71) Applicant: Cisco Technology, Inc., San Jose, CA (US)

(72) Inventor: Kareem Aladdin Nassar, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/179,762

(22) Filed: Nov. 2, 2018

(65) Prior Publication Data

US 2020/0145616 A1 May 7, 2020

(51) Int. Cl.
| H04N 7/15 | (2006.01) |
| G06K 9/00 | (2006.01) |
| G10L 15/07 | (2013.01) |
| G06F 9/455 | (2018.01) |
| G06F 9/50 | (2006.01) |

(52) U.S. Cl.
CPC ......... *H04N 7/157* (2013.01); *G06F 9/45533* (2013.01); *G06F 9/5027* (2013.01); *G06K 9/00288* (2013.01); *G10L 15/07* (2013.01); *G06F 2009/45579* (2013.01)

(58) Field of Classification Search
USPC ..................................................... 348/14.08
See application file for complete search history.

(56) References Cited

U.S. PATENT DOCUMENTS

| 2014/0164532 | A1* | 6/2014 | Lynch | H04L 12/1818 709/206 |
| 2015/0067503 | A1* | 3/2015 | Slayton | G06F 9/453 715/708 |
| 2016/0335532 | A1* | 11/2016 | Sanghavi | H04L 51/02 |
| 2018/0098030 | A1 | 4/2018 | Morabia et al. | |
| 2018/0131904 | A1 | 5/2018 | Segal | |
| 2019/0189117 | A1* | 6/2019 | Kumar | H04L 51/02 |

OTHER PUBLICATIONS

International Search Report for application No. PCT/US2019/059115 dated Feb. 19, 2020.
Anonymous, "Voicera: A Meeting Recording App for All of Us", XP055665864, URL:http://web.archive.orgjweb/20180215102041/https://yournerdybestfriend .com/2018/01/12/voicera-a-meeting-recording-app-for-all-of-us/, Feb. 15, 2018, pp. 1-5.
Beth Ziesenis, "Voicera Overview", Retrieved from the Internet:URL:https://www.youtube.comjwatch?v=Ro-jbNLbbpA [retrieved on Feb. 7, 2020], XP054980201, Jan. 12, 2018, 2 pages.

* cited by examiner

*Primary Examiner* — Amal S Zenati
(74) *Attorney, Agent, or Firm* — Merchant & Gould P.C.

(57) ABSTRACT

One embodiment of the present invention sets forth a technique for enhancing meeting participation by an interactive virtual assistant. The technique includes loading a resource for conducting the meeting over a teleconferencing system. The technique also includes configuring, based on the resource, virtual input/output (I/O) devices for integrating the interactive virtual assistant into the teleconferencing system during the meeting. In response to a command received over a first device in the virtual I/O devices, the technique further includes generating, by the interactive virtual assistant, output containing a response to the command over a second device in the virtual I/O devices.

20 Claims, 4 Drawing Sheets

ENHANCING MEETING PARTICIPATION BY AN INTERACTIVE VIRTUAL ASSISTANT

BACKGROUND

Field of the Various Embodiments

Embodiments of the present invention relate generally to interactive virtual assistants, and more particularly, to enhancing meeting participation by interactive virtual assistants.

Description of the Related Art

Recent technological advances have allowed meetings to be conducted more efficiently and effectively. For example, network-enabled devices have been deployed with solutions that allow people to conduct teleconferences or videoconferences with one another instead of requiring all participants to be in the same physical location. The solutions may also allow the participants to record video and/or audio during meetings, generate transcripts from meeting recordings, share notes and minutes with one another, find meeting times that work best for most or all participants, and/or interact or collaborate within a virtual or augmented environment.

However, meeting management solutions typically have limited interactivity with meeting participants. For example, an interactive virtual assistant may be used to record a meeting; generate a transcript of the meeting; and/or identify highlights, themes, sentiments, summaries, and/or insights related to the meeting. To add the interactive virtual assistant to a meeting, a user may manually dial a number that connects to the interactive virtual assistant and/or run a native, mobile, and/or web application that executes the interactive virtual assistant. Meeting attendees may then issue voice commands to the interactive virtual assistant and/or otherwise interact with the interactive virtual assistant through the phone connection and/or application. On the other hand, the meeting attendees may interact with one another via a much more immersive environment provided by a videoconferencing system, which may include an audio feed, video feed, live chat, screen sharing, and/or other communication channels and/or functionality.

As the foregoing illustrates, what is needed is a technological improvement for improving the integration and/or interactivity of interactive virtual assistants in meeting environments.

SUMMARY

One embodiment of the present invention sets forth a technique for enhancing meeting participation by an interactive virtual assistant. The technique includes loading a resource for conducting the meeting over a teleconferencing system. The technique also includes configuring, based on the resource, virtual input/output (I/O) devices for integrating the interactive virtual assistant into the teleconferencing system during the meeting. In response to a command received over a first device in the virtual I/O devices, the technique further includes generating, by the interactive virtual assistant, output containing a response to the command over a second device in the virtual I/O devices.

At least one advantage and technological improvement of the disclosed techniques is an increase in the number of channels and/or interfaces available for interaction with the interactive virtual assistant. As a result, human participants in the meeting may use the channels and/or interfaces to detect the presence of the interactive virtual assistant, provide different types of commands to the interactive virtual assistant, and/or receive different types of output from the interactive virtual assistant. At the same time, increased access to meeting information may allow the interactive virtual assistant to better understand the commands, support a greater number or variety of commands, and/or deriver greater insights from the meeting. Consequently, the disclosed techniques provide technological improvements in the interactivity, functionality, and performance of interactive virtual assistants and/or user experiences with the interactive virtual assistants.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
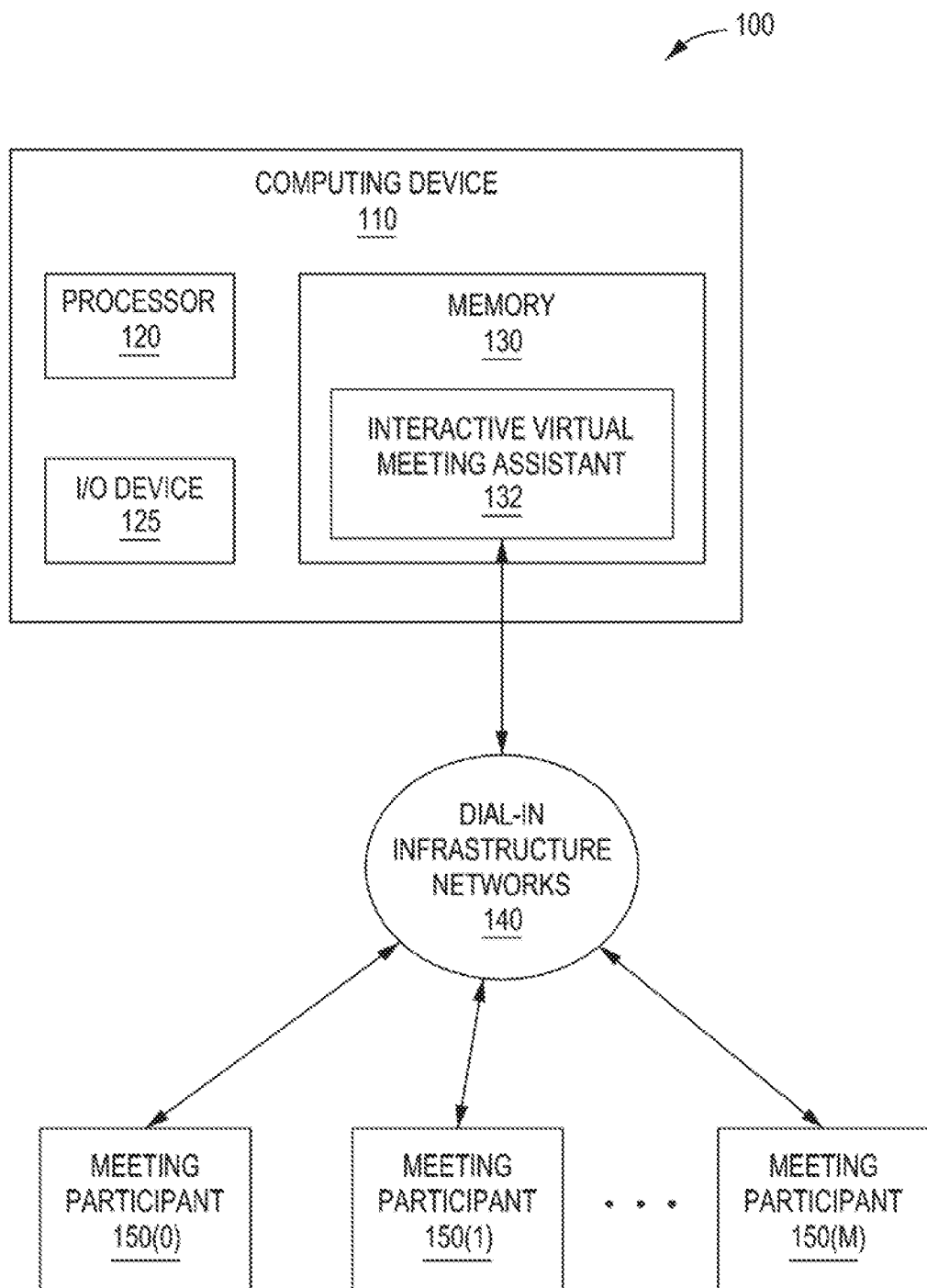
FIG. 1 is a block diagram illustrating a system configured to implement one or more aspects of the present disclosure.

FIG. 1 illustrates a system 100 configured to implement one or more aspects of the present disclosure. As shown, system 100 includes, without limitation, a computing device 110 coupled via dial-in infrastructure networks 140 to multiple meeting participants 150(0) to 150(m).

As shown, computing device 110 includes, without limitation, a processor 120, input/output (I/O) devices 125, and a memory 130. Processor 120 may be any technically feasible form of processing device configured to process data and execute program code. Processor 120 could be, for example, a central processing unit (CPU), a graphics processing unit (GPU), an application-specific integrated circuit (ASIC), a field-programmable gate array (FPGA), and so forth. I/O devices 125 may include devices configured to receive input or provide output, including, for example, a keyboard, a mouse, a display, and so forth.

Memory 130 may be any technically feasible storage medium configured to store data and software applications. Memory 130 may be, for example, a hard disk, a random-access memory (RAM) module, a read-only memory (ROM), and so forth. As also shown, memory 130 includes, without limitation, an interactive virtual meeting assistant 132, which is a software application that, when executed by processor 120, causes processor 120 to execute an interactive virtual meeting assistant application. Interactive virtual meeting assistant 132 may include any technically feasible type of virtual meeting assistant, such as the EVA application from VOICERA, INC.

Dial-in infrastructure networks 140 may be any technically feasible network or set of interconnected communication links that enable interactive virtual meeting assistant 132, as executed by processor 120, to participate in a meeting with one or more meeting participants 150(0) to 150(m). In various embodiments, dial-in infrastructure networks 140 may include, without limitation, one or more telephone line connections or one or more computer connections, such as a local area network (LAN), wide area network (WAN), the World Wide Web, or the Internet, among others. Dial-in infrastructure networks 140 may also allow interactive virtual meeting assistant 132 to access other information via the networks, such as by accessing information via the World Wide Web, or the Internet, among others.

Meeting participants 150(0) to 150(m) represent one or more human and/or computer participants in a meeting environment. Each of meeting participants 150(0) to 150(m) may be connected to other meeting participants and interactive virtual meeting assistant 132, as executed by processor 120, via any technically feasible device that forms a connection to other meeting participants, such as a telephone, smartphone, computing device, or personal data assistant, among others. The connections linking meeting participants 150(0) to 150(m) may be any technically feasible communication link(s), including, without limitation, communication links in dial-in infrastructure networks 140 and/or external communication links such as telephone line connections and/or network connections to a local area network (LAN), wide area network (WAN), the World Wide Web, or the Internet, among others.

Although FIG. 1 shows interactive virtual meeting assistant 132 stored in memory 130 of computing device 110, in alternative embodiments, interactive virtual meeting assistant 132 may be stored in part or entirely in memory 130 and/or on any technically feasible memory device internal to or external to computing device 110, including any memory device coupled to computing device 110 through a wired connection, a wireless connection, a network connection, and so forth.

Interactive virtual meeting assistant 132 includes functionality to join a meeting hosted by a teleconferencing system as a full participant. The teleconferencing system may provide features and/or services that include, but are not limited to, audio, video, chat, screen sharing, file sharing, virtual reality, webcasts, and/or webinars. For example, interactive virtual meeting assistant 132 may obtain a title, location (e.g., physical address, building number, conference room name, teleconferencing link, phone number, etc.), description, agenda, time, duration, list of participants, inviter or organizer, and/or other information describing the meeting from a calendar invitation, email, text message, chat message, voicemail, phone call, and/or other communication related to the meeting. At the start of the meeting, interactive virtual meeting assistant 132 may load a Uniform Resource Locator (URL) for the meeting in a headless browser and "sign in" to the meeting as a participant. Interactive virtual meeting assistant 132 may also install virtual input/output (I/O) devices for integrating interactive virtual meeting assistant 132 into the meeting and use the virtual I/O devices generate a visual, audio, and/or text-based representation of interactive virtual meeting assistant 132 in the meeting.

During the meeting, interactive virtual meeting assistant 132 may capture audio and/or video of the meeting; record notes or action items generated during the meeting; and/or generate a transcript and/or translation from the audio and/or video recording of the meeting. Interactive virtual meeting assistant 132 may additionally use the virtual I/O devices to detect commands issued by participants 150(0) to 150(m) and generate output in response to the commands. For example, interactive virtual meeting assistant 132 may create "highlights" and/or action items that are flagged by one or more meeting participants 150(0) to 150(m) as important; capture screenshots, images, video, and/or audio during the meeting; and/or load and/or provide links to a meeting agenda, documents, charts, visualizations, and/or other types of data associated with the meeting. As a result, interactive virtual meeting assistant 132 may provide a more interactive and/or immersive user experience for meeting participants 150(0) to 150(m) than conventional meeting management solutions and/or virtual assistants that interact with users via more limited channels (e.g., only audio).

Enhancing Meeting Attendance by Interactive Virtual Assistants

Figure 2:
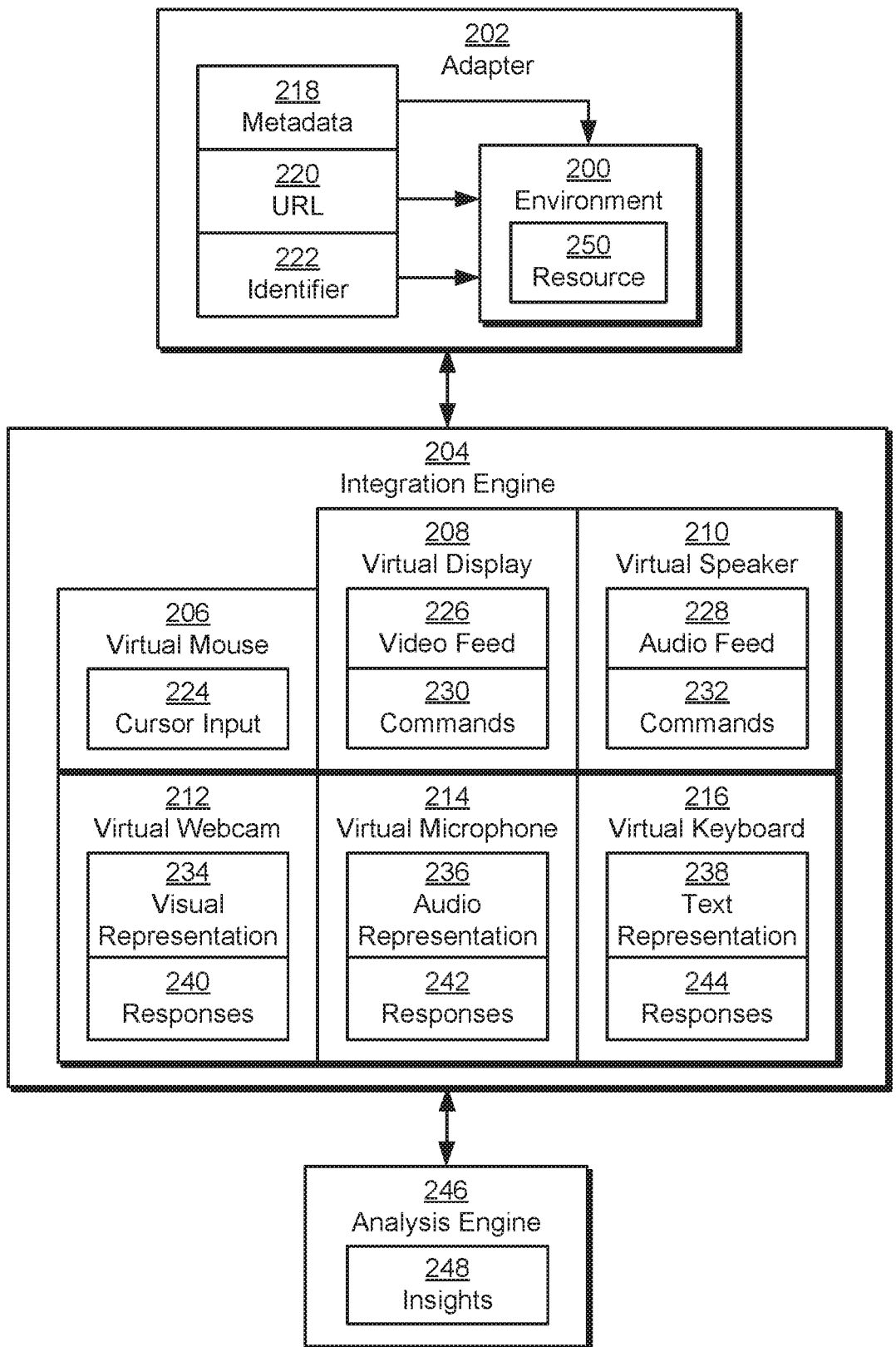
FIG. 2 is a more detailed illustration of functionality provided by the interactive virtual meeting assistant of FIG. 1, according to various embodiments of the present invention.

FIG. 2 is a more detailed illustration of functionality provided by interactive virtual meeting assistant 132 of FIG. 1, according to various embodiments of the present invention. As shown, the functionality may be provided by an adapter 202, an integration engine 204, and an analysis engine 246, which can be implemented as part of and/or separately from interactive virtual meeting assistant 132 and/or one another. Each of these components is described in further detail below.

Adapter 202 may interface with an environment 200 in which a meeting is hosted to add interactive virtual meeting assistant 132 as a participant in the meeting. For example, adapter 202 may be customized to interact with a "sign in" flow of a web application, native application, and/or other type of application for accessing a videoconferencing system on which the meeting is hosted. As a result, a different version of adapter 202 may be created for each provider of web conferencing, videoconferencing, and/or teleconferencing services into which interactive virtual meeting assistant 132 is to be fully integrated.

Integration engine 204 may provide virtual I/O devices that allow interactive virtual meeting assistant 132 to interact with other (e.g., human) participants in the meeting via communication channels supported by the provider of the web conferencing, videoconferencing, and/or teleconferencing system on which the meeting is hosted. For example, integration engine 204 may provide a virtual mouse 206 that allows interactive virtual meeting assistant 132 to generate cursor input 224 for navigating a user interface associated with the provider, a virtual display 208 that is used to receive a video feed 226 of the meeting, a virtual speaker 210 that is used to receive an audio feed 228 of the meeting, a virtual webcam 212 that generates a visual representation 234 of interactive virtual meeting assistant 132, a virtual microphone 214 that generates an audio representation 236 of interactive virtual meeting assistant 132, and a virtual keyboard 216 that generates a text representation 238 of interactive virtual meeting assistant 132.

During the meeting, analysis engine 246 may use virtual I/O devices provided by integration engine 204 to implement the functionality of interactive virtual meeting assistant 132. For example, analysis engine 246 may analyze video feed 226 and/or audio feed 228 to detect commands 230-232 issued by the other participants to interactive virtual meeting assistant 132. Analysis engine 246 may also generate responses 240-244 to commands 230-232 that are outputted over virtual webcam 212, virtual microphone 214, and/or virtual keyboard 216. In another example, analysis engine 246 may analyze video feed 226 and/or audio feed 228 to identify insights 248 related to the meeting. Analysis engine 246 may then output insights 248 during the meeting and/or store insights 248 in association with the meeting for subsequent retrieval by one or more participants in the meeting and/or other users with an interest in the meeting.

More specifically, adapter 202 may obtain metadata 218 for the meeting from a calendar invitation, email, text message, chat message, voicemail, phone call, and/or another communication or content related to scheduling or creating the meeting. As mentioned above, metadata 218 may include a date and time of the meeting, a location of the meeting (e.g., conference room, building, campus, teleconferencing ID, zip code, city, etc.), an organizer, a list of attendees, an agenda, a description, and/or other attributes related to the meeting.

Metadata 218 may additionally include information for accessing a resource 250 that is used to conduct the meeting over a teleconferencing system. For example, the meeting's location in metadata 218 may include a Uniform Resource Locator (URL) 220 for a web page that is used to access a teleconferencing and/or videoconferencing system for hosting the meeting. URL 220 may also, or instead, be provided separately from other metadata for 218 for the meeting (e.g., in a follow-up email or communication to a calendar invitation for the meeting instead of within the calendar invitation).

At the start of the meeting, an instance and/or version of adapter 202 may load resource 250 in the corresponding provider's environment 200. For example, multiple instances of adapter 202 may execute within different containers on a host to isolate resource usage by the instances from one another. Each instance may execute a version of adapter 202 that is customized to and/or compatible with the workflow for joining a meeting in a corresponding environment 200. One or more instances and/or versions of adapter 202 may use a headless browser to load a web page at a given URL 220 to access a corresponding meeting on a web-based videoconferencing system. One or more instances and/or versions of adapter 202 may also, or instead, input URL 220 and/or another representation of the meeting's location (e.g., a meeting ID for the meeting) into a native application to load one or more resources for accessing a corresponding meeting with a different videoconferencing provider (e.g., a videoconferencing system that is accessed using the native application).

Next, adapter 202 may generate input into resource 250 for adding interactive virtual meeting assistant 132 as a participant in the meeting. The input may include an identifier 222 for interactive virtual meeting assistant 132 and/or cursor input 224 that is used to navigate a workflow for joining the meeting. For example, adapter 202 may be configured to navigate one or more screens of a user interface provided by resource 250 and/or environment 200 for joining the meeting. First, adapter 202 may use virtual mouse 206 provided by integration engine 204 to generate cursor input 224 that selects a text box for entering a name of the participant. Next, adapter 202 may use virtual keyboard 216 provided by integration engine 204 to enter a name and/or other identifier 222 for interactive virtual meeting assistant 132 into the text box. Adapter 202 may then generate additional cursor input 224 for submitting identifier 222 to environment 200 and/or navigating subsequent screens in the user interface until interactive virtual meeting assistant 132 is included as a participant in the meeting.

After interactive virtual meeting assistant 132 joins the meeting via adapter 202, integration engine 204 may configure some or all of the virtual I/O devices to integrate interactive virtual meeting assistant 132 into environment 200. For example, integration engine 204 may use an application programming interface (API) with environment 200 to receive video feed 226 and/or audio feed 228 from a corresponding videoconferencing system. In another example, integration engine 204 may obtain video feed 226 and/or audio feed 228 from a graphics card, sound card, and/or other hardware and/or software resources on a host in which resource 250 is loaded. In a third example, integration engine 204 may configure virtual mouse 206, virtual webcam 212, virtual microphone 214, and/or virtual keyboard 216 to generate output that is directed to resource 250 and/or environment 200.

In one or more embodiments, output generated by integration engine 204 using virtual mouse 206, virtual webcam 212, virtual microphone 214, and/or virtual keyboard 216 includes one or more representations of interactive virtual meeting assistant 132. The representations may include a visual representation 234 that is outputted through virtual webcam 212. For example, visual representation 234 may include a logo, animation, avatar, and/or other graphic representing interactive virtual meeting assistant 132 that is displayed (e.g., in a split-screen view of participants in the meeting) to indicate that interactive virtual meeting assistant 132 is attending the meeting.

The representations may also, or instead, include an audio representation 234 that is outputted through virtual microphone 214. For example, audio representation 236 may include one or more words, phrases, and/or sentences that are outputted by a text-to-speech engine for interactive virtual meeting assistant 132 to notify other participants that interactive virtual meeting assistant 132 has joined the meeting. In another example, audio representation 236 may include a chime, jingle, tone, beep, and/or another sound indicating that interactive virtual meeting assistant 132 has joined the meeting.

The representations may also, or instead, include a text representation 238 that is generated via virtual keyboard 216 and outputted to the other participants in a chat module provided by resource 250 and/or environment 200. For example, cursor input 224 generated via virtual mouse 206 may be used to select a text box in a chat module provided by environment 200. Next, virtual keyboard 216 may be used to output, within the chat module, text representation 238 as one or more lines of chat that indicate that interactive virtual meeting assistant 132 has joined the meeting (e.g., "EVA has joined this meeting"). The outputted text representation 238 may also, or instead, include one or more lines of chat that provide hints and/or suggestions for using or interacting with interactive virtual meeting assistant 132

(e.g., a list of possible commands 230-232 and/or configuration options that can be used with interactive virtual meeting assistant 132).

Consequently, visual representation 234, audio representation 236, text representation 238, and/or other representations of interactive virtual meeting assistant 132 may be outputted within environment 200 and/or resource 250 to notify other participants in the meeting of the presence of interactive virtual meeting assistant 132 in the meeting. Such representations and/or other output generated by the virtual I/O devices may further be updated by analysis engine 246 to provide functionality and/or interactivity related to interactive virtual meeting assistant 132.

In particular, analysis engine 246 may analyze video feed 226 from virtual display 208, audio feed 228 from virtual speaker 210, data received from resource 250 (e.g., HyperText Markup Language (HTML) and/or other content from resource 250), and/or other information related to the meeting to detect commands 230-232 to interactive virtual meeting assistant 132 that are issued by participants in the meeting. In turn, analysis engine 246 may use virtual webcam 212, virtual microphone 214, virtual keyboard 216, and/or other virtual I/O devices provided by integration engine 204 to generate output that reflects responses 240-244 by interactive virtual meeting assistant 132 to the issued commands 230-232.

To interact with interactive virtual meeting assistant 132, a participant may preface a verbal command to interactive virtual meeting assistant 132 with a wake word (e.g., "OK Eva"). The participant may also, or instead, generate a text-based command by entering the wake word and command into the chat module provided by resource 250 and/or environment 200. The participant may also, or instead, use a physical gesture (e.g., a hand motion, a head motion, etc.) to activate interactive virtual meeting assistant 132 and follow the gesture with a verbal and/or text command.

Analysis engine 246 may detect the wake word and/or gesture via video feed 226, audio feed 228, and/or the chat module and update visual representation 234, audio representation 236, and/or text representation 238 to indicate that interactive virtual meeting assistant 132 has been activated by the wake word and/or gesture. For example, analysis engine 246 may change visual representation 234 of interactive virtual assistant 132 in virtual webcam 212 to provide visual confirmation of the detected wake word. In another example, analysis engine 246 may use virtual keyboard 216 to generate a text response confirming receipt of the command within the chat module (e.g., "Command received, processing . . . "). In a third example, analysis engine 246 may use virtual microphone 214 to generate a sound and/or verbal output indicating detection of the wake word, gesture, and/or command.

Next, analysis engine 246 may match a phrase following the wake word to a command supported by interactive virtual meeting assistant 132 and execute the command. For example, analysis engine 246 may generate a highlight, action item, reminder, and/or screenshot requested in the command. In another example, analysis engine 246 may obtain a copy of and/or a link to a document, image, chart, visualization, and/or other content requested in the command. In a third example, analysis engine 246 may obtain an agenda, list of participants, and/or other meeting metadata 218 requested in the command.

After the command is executed, analysis engine 246 may update visual representation 234, audio representation 236, and/or text representation 238 to indicate that the command has been executed and/or to output a result of the command. For example, analysis engine 246 may generate text, sound, and/or other output indicating that the action requested in the command was performed. In another example, analysis engine 246 may display a highlight, action item, reminder, screenshot, and/or other content or objects produced by the action. In a third example, analysis engine 246 may output a link to and/or display a document, image, chart, visualization, third-party module, and/or other content requested by the command. In a fourth example, analysis engine 246 may display and/or verbally output an agenda, list of participants, and/or other metadata 218 requested by the command. In a fifth example, analysis engine 246 may play a portion of video feed 226 and/or audio feed 228 requested by the command (e.g., the beginning of the meeting, the most recent 10 seconds of the meeting, etc.).

If a phrase following the wake word and/or gesture cannot be matched to a supported command, analysis engine 246 may generate output indicating that any actions requested by the phrase could not be performed. For example, analysis engine 246 may output an image, animation, text, and/or sound indicating an inability to execute any commands and/or perform any actions based on the content and/or sound quality of the phrase.

Analysis engine 246 may additionally generate and/or output insights 248 based on analysis of video feed 226, audio feed 228, and/or other data from resource 250 and/or environment 200. For example, analysis engine 246 may apply a speech recognition technique, face detection technique, and/or optical character recognition (OCR) technique to video feed 226 and/or audio feed 228 to generate a transcript of the meeting, produce a translation of the transcript, identify participants and/or speakers in the meeting, and/or capture text displayed in the participants' screens (e.g., during screen sharing by the participants) and/or the chat module of environment 200. Analysis engine 246 may use virtual webcam 212 to display the transcript and/or translation to providing captioning and/or translation of the discussion during the meeting. Analysis engine 246 may also annotate the transcript, translation, and/or recordings of video feed 226 and/or audio feed 228 with the corresponding speakers, arrival and departure times of participants, emotions, topics, themes, and/or other additional insights 248 related to meeting. Finally, analysis engine 246 may store the transcript, translation, metadata, and/or recordings for subsequent review and/or analysis by the participants and/or other users with an interest in the meeting.

In another example, analysis engine 246 may track the time remaining in the meeting. When the time remaining reaches a threshold (e.g., a certain number of minutes before the meeting ends) and/or when a command requesting the time remaining is detected, analysis engine 246 may update visual representation 234 with a countdown timer and/or generate an audio notification of the remaining time in the meeting.

Figure 3:
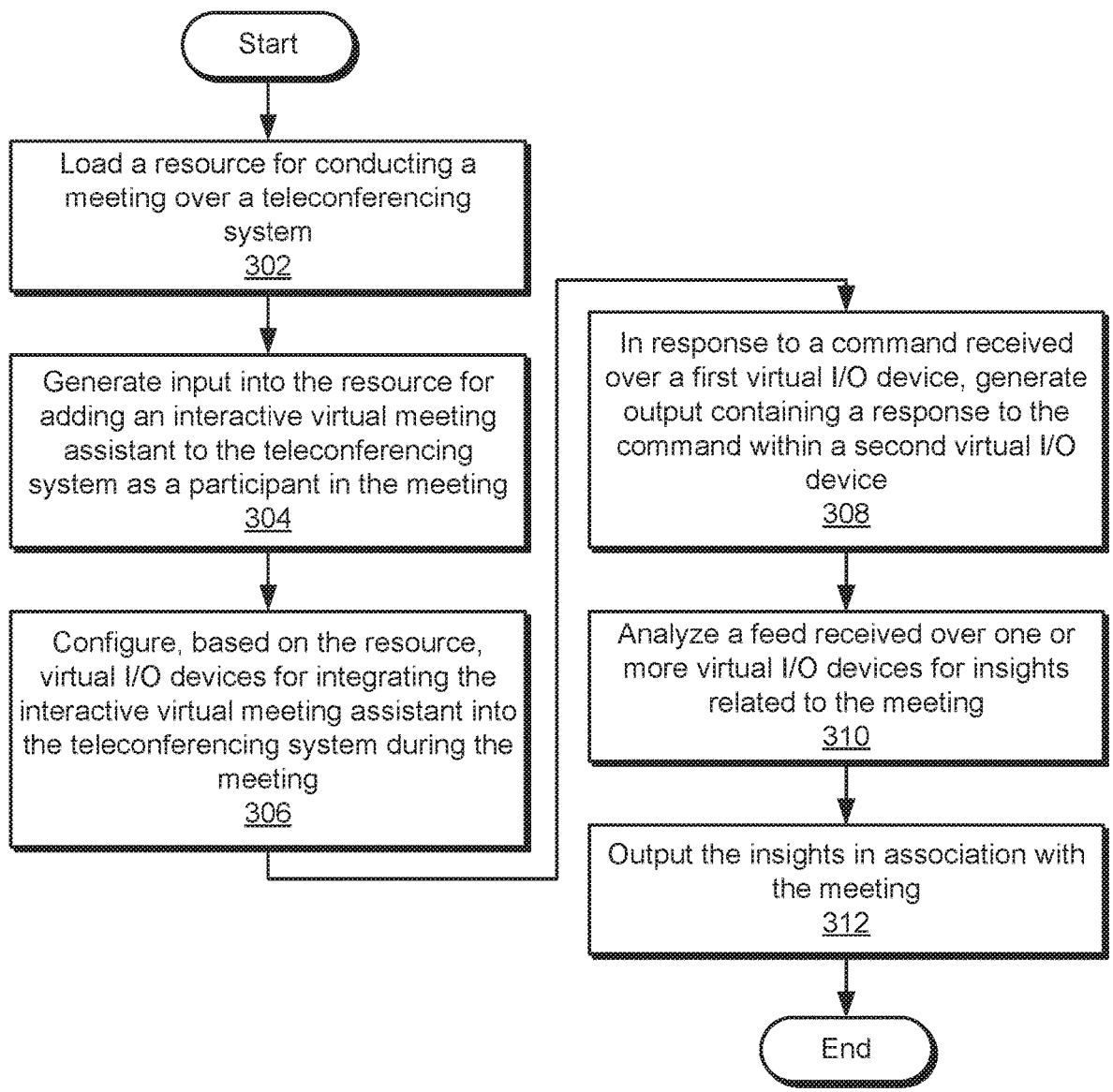
FIG. 3 is a flow diagram of method steps for enhancing meeting participation by the interactive virtual meeting assistant of FIG. 1, according to various embodiments of the present invention.

FIG. 3 is a flow diagram of method steps for enhancing meeting participation by interactive virtual meeting assistant 132, according to various embodiments of the present invention. Although the method steps are described in conjunction with the systems of FIGS. 1-2, persons skilled in the art will understand that any system configured to perform the method steps, in any order, is within the scope of the present invention.

As shown, adapter 202 loads 302 a resource for conducting a meeting over a teleconferencing system. For example, adapter 202 may use a URL for the meeting to load a web page for the meeting with a videoconferencing provider. Next, adapter 202 generates 304 input into the resource for adding interactive virtual meeting assistant 132 to the teleconferencing system as a participant in the meeting, as described in further detail below with respect to FIG. 4.

Integration engine 204 then configures 306, based on the resource, virtual I/O devices for integrating interactive virtual meeting assistant 132 into the teleconferencing system during the meeting. For example, integration engine 204 may use a virtual mouse to navigate a user interface of the teleconferencing system. Integration engine 204 may also, or instead use the layout and/or structure of the user interface to obtain a video feed and audio feed from the meeting, create a virtual display from the video feed, and create a virtual speaker from the audio feed. Integration engine 204 may also, or instead, output a visual representation of the interactive virtual assistant through a virtual webcam, an audio representation of the interactive virtual assistant through a virtual microphone, and/or a text representation of the interactive virtual assistant using a virtual keyboard. As a result, integration engine 204 may allow interactive virtual meeting assistant 132 to interact with other participants in the meeting via some or all communication channels supported by the teleconferencing system.

In response to a command received over a first virtual I/O device, analysis engine 246 generates 308 output containing a response to the command within a second virtual I/O device. For example, analysis engine 246 may detect and/or receive voice commands, text commands, and/or gestures from the video feed and/or audio feed; execute the commands; and/or output confirmation of the commands and/or results of executing the commands as audio responses, visual responses, and/or text responses.

Analysis engine 246 also analyzes 310 a feed received over one or more virtual I/O devices for insights related to the meeting and outputs 312 the insights in association with the meeting. For example, analysis engine 246 may apply a speech recognition technique, facial recognition technique, OCR technique, and/or another type of analysis to the video feed, audio feed, and/or other data from the teleconferencing system to produce a recording of the meeting, a transcription of the meeting, and/or a translation of the transcription. Analysis engine 246 may also, or instead, identify an attendee, speaker, emotion, and/or topic associated with the recording, transcription, and/or translation. Analysis engine 246 may also, or instead, retrieve an agenda for the meeting, a chart, a visualization, and/or a time remaining in the meeting. Analysis engine 246 may output the insights during the meeting (e.g., displaying a live transcription and/or translation of speech in the meeting) and/or store the insights for subsequent review and/or analysis by meeting participants and/or other users.

Figure 4:
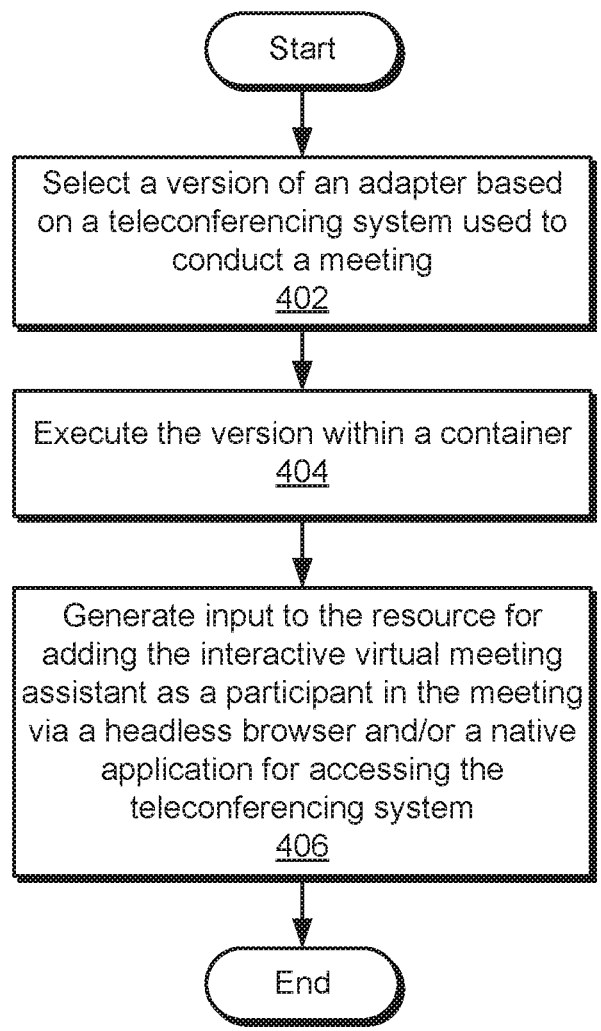
FIG. 4 is a flow diagram of method steps for executing an adapter that generates input for adding the interactive virtual meeting assistant of FIG. 1 to a teleconferencing system as a participant in a meeting, according to various embodiments of the present invention.

FIG. 4 is a flow diagram of method steps for executing an adapter that generates input for adding interactive virtual meeting assistant 132 to a teleconferencing system as a participant in a meeting, according to various embodiments of the present invention. Although the method steps are described in conjunction with the systems of FIGS. 1-2, persons skilled in the art will understand that any system configured to perform the method steps, in any order, is within the scope of the present invention.

As shown, integration engine 204 and/or another component selects 402 a version of adapter 202 based on a teleconferencing system used to conduct the meeting. For example, the component may use a version of adapter 202 that is customized to and/or compatible with a workflow for joining meetings in the teleconferencing system and/or an application (e.g., web application, native application, etc.) that is used to access the teleconferencing system.

Next, the component executes 404 the version within a container to isolate the version from other versions and/or instances of adapter 202 that are used to add instances of interactive virtual meeting assistant 132 to other meetings. The executed version of adapter 202 then generates 406 input to the resource for adding interactive virtual meeting assistant 132 as a participant in the meeting via a headless browser and/or a native application for accessing the teleconferencing system. For example, adapter 202 may generate cursor input to select a text box for identifying a participant in the meeting, input an identifier and/or name for interactive virtual meeting assistant 132 into the text box, submit the entered identifier and/or name, and/or generate additional cursor and/or text input required to join the meeting as interactive virtual meeting assistant 132.

In sum, the disclosed techniques may provide increased interactivity and/or functionality associated with an interactive virtual assistant across multiple meeting environments and/or teleconferencing systems. Different versions of an adapter may be used to add the interactive virtual assistant as a meeting participant to the teleconferencing systems and/or meeting environments. Virtual I/O devices may then be used to transmit audio and/or video from the meeting to the interactive virtual assistant and output representations of the interactive virtual assistant to other participants in the meeting. Interaction between the interactive virtual assistant and the other participants may be carried out by detecting commands and/or gestures in the audio and/or video and updating the representations of the interactive virtual assistant with responses to the commands and/or gestures. Transcriptions, translations, attendees, speakers, emotions, topics, themes, and/or other insights related to the meeting may additionally be obtained by analyzing the video, audio, and/or other data related to the meeting. Finally, the insights may be outputted during and/or after the meeting to further enhance the user experience with the interactive virtual assistant.

By integrating the interactive virtual assistant as a full participant in the meeting, the disclosed techniques may increase the number of communication channels available for interaction with the interactive virtual assistant during the meeting. As a result, human participants in the meeting may use the communication channels to better detect the presence of the interactive virtual assistant, provide different types of commands to the interactive virtual assistant, and/or receive different types of output from the interactive virtual assistant. Automatic execution of workflows for adding the interactive virtual assistant as a participant at the start of the meeting may further reduce overhead associated with manually executing an application for the interactive virtual assistant and/or dialing a number to reach the interactive virtual assistant during the meeting. At the same time, increased access to meeting information may improve the interactive virtual assistant's understanding of the commands, ability to support a greater number or variety of commands, and/or generation of insights from the meeting. Consequently, the disclosed techniques provide technological improvements in the interactivity, functionality, and performance of interactive virtual assistants and/or user experiences with the interactive virtual assistants.

1. In some embodiments, a method for integrating an interactive virtual assistant into a meeting comprises loading a resource for conducting the meeting over a teleconferencing system; configuring, based on the resource, virtual input/output (I/O) devices for integrating the interactive virtual assistant into the teleconferencing system during the meeting; and in response to a command received over a first device in the virtual I/O devices, generating, by the interactive virtual assistant, output comprising a response to the command over a second device in the virtual I/O devices.

2. The method of clause 1, further comprising: analyzing a feed received over one or more of the virtual I/O devices for insights related to the meeting; and outputting the insights in association with the meeting.

3. The method of clauses 1-2, wherein analyzing the feed comprises at least one of applying a speech recognition technique to a video feed and an audio feed of the meeting; applying a face detection technique to the video feed; and applying an optical character recognition (OCR) technique to the video feed.

4. The method of clauses 1-3, wherein the insights comprise at least one of a recording of the meeting, a transcription of the meeting, a translation of the transcription, an attendee, a speaker, an emotion, a topic, an agenda for the meeting, a chart, a visualization, and a time remaining in the meeting.

5. The method of clauses 1-4, wherein configuring the virtual I/O devices for integrating the interactive virtual assistant into the meeting comprises outputting a representation of the interactive virtual assistant through one or more of the virtual I/O devices.

6. The method of clauses 1-5, wherein the representation comprises at least one of a visual representation, an audio representation, and a text representation.

7. The method of clauses 1-6, further comprising executing an adapter that generates input into the resource for adding the interactive virtual assistant to the teleconferencing system as a participant in the meeting.

8. The method of clauses 1-7, wherein executing the adapter that generates input into the resource for adding the interactive virtual assistant to the teleconferencing system as the participant in the meeting comprises at least one of selecting a version of the adapter based on the teleconferencing system; executing the version within a container; generating the input to the resource via a headless browser; and generating the input to the resource via a native application for accessing the teleconferencing system.

9. The method of clauses 1-8, wherein the input comprises at least one of an identifier for the interactive virtual assistant and cursor input for joining the meeting.

10. The method of clauses 1-9, wherein the virtual I/O devices comprise at least one of a virtual display, a virtual microphone, a virtual speaker, a virtual webcam, a virtual keyboard, and a virtual mouse.

11. The method of clauses 1-10, wherein the command comprises at least one of a voice command, a text command, and a gesture.

12. The method of clauses 1-11, wherein the response comprises at least one of a confirmation of the command and a result of executing the command.

13. In some embodiments, a non-transitory computer readable medium stores instructions that, when executed by a processor, cause the processor to perform the steps of loading a resource for conducting the meeting over a teleconferencing system; configuring, based on the resource, virtual input/output (I/O) devices for integrating the interactive virtual assistant into the teleconferencing system during the meeting; and in response to a command received over a first device in the virtual I/O devices, generating, by the interactive virtual assistant, output comprising a response to the command over a second device in the virtual I/O devices.

14. The non-transitory computer readable medium of clause 13, wherein the steps further comprise analyzing a feed received over one or more of the virtual I/O devices for insights related to the meeting; and outputting the insights in association with the meeting.

15. The non-transitory computer readable medium of clauses 13-14, wherein analyzing the feed comprises at least one of applying a speech recognition technique to a video feed and an audio feed of the meeting; applying a face detection technique to the video feed; and applying an optical character recognition (OCR) technique to the video feed.

16. The non-transitory computer readable medium of clauses 13-15, wherein the steps further comprise executing an adapter that generates input into the resource for adding the interactive virtual assistant to the teleconferencing system as a participant in the meeting.

17. The non-transitory computer readable medium of clauses 13-16, wherein executing the adapter that generates input into the resource for adding the interactive virtual assistant to the teleconferencing system as the participant in the meeting comprises at least one of selecting a version of the adapter based on the teleconferencing system; executing the version within a container; generating the input to the resource via a headless browser; and generating the input to the resource via a native application for accessing the teleconferencing system.

18. The non-transitory computer readable medium of clauses 13-17, wherein the virtual I/O devices comprise at least one of a virtual display, a virtual microphone, a virtual speaker, a virtual webcam, a virtual keyboard, and a virtual mouse.

19. The non-transitory computer readable medium of clauses 13-18, wherein the command comprises at least one of a voice command, a text command, and a gesture and the response comprises at least one of an audio response, a visual response, and a text response 20. In some embodiments, a system comprises a memory that stores instructions, and a processor that is coupled to the memory and, when executing the instructions, is configured to load a resource for conducting the meeting over a teleconferencing system; execute an adapter that generates input into the resource for adding the interactive virtual assistant to the teleconferencing system as a participant in the meeting; configure, based on the resource, virtual input/output (I/O) devices for integrating the interactive virtual assistant into the teleconferencing system during the meeting; and in response to a command received over a first device in the virtual I/O devices, generate, by the interactive virtual assistant, output comprising a response to the command over a second device in the virtual I/O devices.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for integrating an interactive virtual assistant into a meeting, comprising:
   selecting a version of an adapter from a plurality of versions based on a teleconferencing system, wherein the version of the adapter is customized to a workflow for joining the meeting in the teleconferencing system, and wherein each of the plurality of versions are customized differently to interact with and access one of a plurality of meetings;
   executing the adapter within a container to isolate the version from other versions of the plurality of versions, wherein each of the plurality of versions execute within different containers;
   loading, via the adapter, a resource for conducting the meeting over the teleconferencing system;
   generating, via the adapter, input into the resource for adding the interactive virtual assistant as a participant to the meeting;
   configuring, based on the resource, virtual input/output (I/O) devices for integrating the interactive virtual assistant into the teleconferencing system during the meeting; and
   in response to a command received over a first device in the virtual I/O devices, generating, by the interactive virtual assistant, output comprising a response to the command over a second device in the virtual I/O devices.

2. The method of claim 1, further comprising:
   analyzing a feed received over one or more of the virtual I/O devices for insights related to the meeting; and
   outputting the insights in association with the meeting.

3. The method of claim 2, wherein analyzing the feed comprises at least one of:
   applying a speech recognition technique to a video feed and an audio feed of the meeting;
   applying a face detection technique to the video feed; or
   applying an optical character recognition (OCR) technique to the video feed.

4. The method of claim 2, wherein the insights comprise at least one of a recording of the meeting, a transcription of the meeting, a translation of the transcription, an attendee, a speaker, an emotion, a topic, an agenda for the meeting, a chart, a visualization, or a time remaining in the meeting.

5. The method of claim 1, wherein configuring the virtual I/O devices for integrating the interactive virtual assistant into the meeting comprises outputting a representation of the interactive virtual assistant through one or more of the virtual I/O devices.

6. The method of claim 5, wherein the representation comprises at least one of a visual representation, an audio representation, or a text representation.

7. The method of claim 1, wherein
   the input to the resource is via one of a headless browser or a native application for accessing the teleconferencing system.

8. The method of claim 1, wherein the input comprises at least one of an identifier for the interactive virtual assistant or cursor input for joining the meeting.

9. The method of claim 1, wherein the virtual I/O devices comprise at least one of a virtual display, a virtual microphone, a virtual speaker, a virtual webcam, a virtual keyboard, or a virtual mouse.

10. The method of claim 1, wherein the command comprises at least one of a voice command, a text command, or a gesture.

11. The method of claim 1, wherein the response comprises at least one of a confirmation of the command or a result of executing the command.

12. A non-transitory computer readable medium storing instructions that, when executed by a processor, cause the processor to perform the steps of:
   selecting a version of an adapter from a plurality of adapter versions based on a teleconferencing system, wherein the version of the adapter is customized to a workflow for joining the meeting in the teleconferencing system, and wherein each of the plurality of versions are customized differently to interact with and access one of a plurality of meetings;
   executing the adapter within a container to isolate the version from other versions of the plurality of versions, wherein each of the plurality of versions execute within different containers;
   loading, via the adapter, a resource for conducting the meeting over the teleconferencing system;
   generating, via the adapter, input into the resource for adding the interactive virtual assistant as a participant to the meeting;
   configuring, based on the resource, virtual input/output (I/O) devices for integrating the interactive virtual assistant into the teleconferencing system during the meeting; and
   in response to a command received over a first device in the virtual I/O devices, generating, by the interactive virtual assistant, output comprising a response to the command over a second device in the virtual I/O devices.

13. The non-transitory computer readable medium of claim 12, wherein the steps further comprise:
   analyzing a feed received over one or more of the virtual I/O devices for insights related to the meeting; and
   outputting the insights in association with the meeting.

14. The non-transitory computer readable medium of claim 13, wherein analyzing the feed comprises at least one of:
   applying a speech recognition technique to a video feed and an audio feed of the meeting;
   applying a face detection technique to the video feed; or
   applying an optical character recognition (OCR) technique to the video feed.

15. The non-transitory computer readable medium of claim 12, wherein the input to the resource is via one of a headless browser or a native application for accessing the teleconferencing system.

16. The non-transitory computer readable medium of claim 12, wherein the virtual I/O devices comprise at least one of a virtual display, a virtual microphone, a virtual speaker, a virtual webcam, a virtual keyboard, or a virtual mouse.

17. The non-transitory computer readable medium of claim 12, wherein the command comprises at least one of a voice command, a text command, or a gesture and the response comprises at least one of an audio response, a visual response, or a text response.

18. A system, comprising:
   a memory that stores instructions; and
   a processor that is coupled to the memory and, when executing the instructions, is configured to:
      select a version of an adapter from a plurality of adapter versions based on the teleconferencing system, wherein the version of the adapter is customized to a workflow for joining a meeting in the teleconferencing system, and wherein each of the plurality of versions are customized differently to interact with and access one of a plurality of meetings,
      execute the adapter within a container to isolate the version from other versions of the plurality of versions, wherein each of the plurality of versions execute within different containers,
      load, via the adapter, a resource for conducting the meeting over a teleconferencing system,
      generate, via the adapter, input into the resource for adding the interactive virtual assistant to the teleconferencing system as a participant in the meeting,
      configure, based on the resource, virtual input/output (I/O) devices for integrating the interactive virtual assistant into the teleconferencing system during the meeting, and
      in response to a command received over a first device in the virtual I/O devices, generate, by the interactive virtual assistant, output comprising a response to the command over a second device in the virtual I/O devices.

19. The system of claim 18, wherein the processor is further configured to:
   analyze a feed received over one or more of the virtual I/O devices for insights related to the meeting; and
   output the insights in association with the meeting.

20. The system of claim 19, wherein the insights comprise at least one of the following: a recording of the meeting, a transcription of the meeting, a translation of the transcription, an attendee, a speaker, an emotion, a topic, an agenda for the meeting, a chart, a visualization, and a time remaining in the meeting.

* * * * *